United States Patent

Feigel et al.

[11] Patent Number: 6,099,086
[45] Date of Patent: *Aug. 8, 2000

[54] SETPOINT GENERATOR FOR CONTROL OF AN ELECTRICALLY CONTROLLED BRAKE SYSTEM

[75] Inventors: Hans-Jörg Feigel, Rosbach; Andreas Klein, Bad Hamburg; Ulrich Neumann, Rossdorf; Lothar Schiel, Hofheim, all of Germany

[73] Assignee: ITT Manufacturing Enterprises, Inc., Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/945,619

[22] PCT Filed: Apr. 3, 1996

[86] PCT No.: PCT/EP96/01455

§ 371 Date: Jan. 12, 1998

§ 102(e) Date: Jan. 12, 1998

[87] PCT Pub. No.: WO96/34784

PCT Pub. Date: Nov. 7, 1996

[30] Foreign Application Priority Data

Apr. 29, 1995 [DE] Germany ............... 195 15 842

[51] Int. Cl.$^7$ .................................................. B60T 15/14
[52] U.S. Cl. .................. 303/113.4; 303/155; 303/191; 303/20

[58] Field of Search ................... 303/113.4, 155, 303/3, 15, 20, 115.2

[56] References Cited

U.S. PATENT DOCUMENTS

| | | |
|---|---|---|
| 5,230,549 | 7/1993 | Osada . |
| 5,261,730 | 11/1993 | Steiner et al. ............... 303/113.4 |
| 5,332,296 | 7/1994 | Morita et al. ............... 303/191 |
| 5,558,409 | 9/1996 | Walenty et al. ............. 303/113.4 |
| 5,564,797 | 10/1996 | Steiner et al. ............... 303/113.4 |
| 5,567,021 | 10/1996 | Gaillard ................... 303/155 |
| 5,586,814 | 12/1996 | Steiner .................... 303/101 |

FOREIGN PATENT DOCUMENTS 0 190 411  8/1986  European Pat. Off. .

*Primary Examiner*—Matthew C. Graham
*Attorney, Agent, or Firm*—Rader, Fishman & Grauer PLLC

[57] ABSTRACT

The setpoint generator according to the invention utilizes the information "pedal travel s" in combination with the information "pedal force p" by weighting them in input circuits 4,5 and summing up the corresponding partial setpoints $p'_s$ and $p'_p$ to form a setpoint $p'_{Hz}$. Here, a countercurrent weighting takes place: If a small force acts on the pedal, the pedal travel is dominant; as the pedal force is growing, the latter is weighted more heavily. In this way, a smooth brake behavior is attained, whereby the comfort is enhanced and the wear of the employed components is reduced.

7 Claims, 2 Drawing Sheets

SETPOINT GENERATOR FOR CONTROL OF AN ELECTRICALLY CONTROLLED BRAKE SYSTEM

BACKGROUND OF THE INVENTION

The present invention relates to a setpoint generator, in particular for a brake pedal in an automotive vehicle for the control of an electrically controlled brake system, with at least two parallely connected sensors working in accordance with different principles, with subsequently connected electronic input circuits.

Such a setpoint generator, in particular for a brake pedal in an automotive vehicle, is known from published German patent application 35 04 096. It is for the control of an electric brake system and contains a parallel connection of a travel sensor and a force sensor, the force sensor supplying the reference variable. To the sensors, there are subsequently connected electronic main circuits which verify the sensor signals according to diverse criteria with respect to plausibility, and which, in case of an error, trigger a warning light. In order to provide a maximum extent of safety and accuracy, the sensors of the known setpoint generator proceed on different principles, and only in case of a stated malfunction of the force sensor, the reference variable is supplied by the travel sensor.

It is to be regarded as a disadvantage of the known setpoint generator that, in particular for exceptionally small signals, the random noise is in the order of magnitude of the signals and thereby distorts them. Hence, there is provided a filtration of the signals which, however, results in a bad temporal behavior, i.e. a slow reaction. This conveys an inert vehicle behavior to the driver which is undesirable. If, however, no filtration is carried out, an uneven braking behavior will occur, which, as well, is felt to be disturbing.

An object of the invention therefore is to prevent the disadvantages of the known setpoint generator and thus to enhance the comfort.

SUMMARY OF THE INVENTION

This object is achieved in that, for the generation of an electric setpoint, the output signals of the sensors are weighted in the electronic input circuits, and respective partial setpoints are summed up. Preferably, the output signals of the sensors are weighted in a way that, in the ranges where a bad signal/noise ratio is found, the corresponding sensor signal has a lesser share than the one that is not disturbed as heavily, so that in total a largely smooth setpoint ensues. Thus, over the entire range of operation, a lesser random noise is attained.

It is provided that the weighting occurs in dependence of the output signal of at least one of the sensors. Here, the weighting may be dependent on the sensor signal itself. The weighting factor thus for instance is small when the signal itself is small and thus shows a bad signal/noise ratio. Provided that there is a characteristic range in which a known disturbance of the sensor signal appears, an accordingly small weighting factor can be provided in this range. Further on, it is provided to make the weighting factor also dependent on the signal of the other sensor, for example if the signal of the one sensor is supposed to get a low weighting while the weighting factor of the other sensor signal is supposed to be large, or vice versa.

According to the invention, it is further on provided that the weighting occurs also in dependence of other sensor signals available in automotive vehicles. These can be signals of a temperature sensor, a humidity sensor or another suitable sensor. The weighting of the sensor signals hence can also be adapted to a temperature dependent or humidity-dependently varying characteristic.

The weighting, accordingly, can correspond to a simple analytical function. Preferably, however, at least one special weighting function is used which, for instance, may be stored in the electronic input circuitry. This weighting function can be derived individually for each vehicle type and optimally adapted to this vehicle type and the desired brake characteristic by way of experiments or as a result of simulating calculations or other suitable methods. The weighting function derived this way may then be stored in a vehicle-specific read-only memory or, as well, in an overwritable memory. It is provided to store only one weighting function if, from this one, the one or more other weighting functions can be derived (e.g. are complementary). Several different weighting functions have to be stored if they are independent from each other, or if, for other reasons, it appears to make sense storing them separately.

Depending on structure and requirements of the electronic brake system, it can be advantageous to derive a setpoint for the pressure of a hydraulic brake system or for the actuation travel of a brake pad by summation of the partial setpoints or, alternatively a setpoint proportional to the deceleration to be attained. In this way, the setpoint generator can be adapted to the most diverse brake systems.

Generally, one of the variables for the setpoint will be decided on (pressure, travel, or the like) and processed by a controller which emits an appropriate control variable. There is, however, another advantageous possibility of having several different variables processed by respective controllers and only summing up the according control variables. In this way, the driving comfort can be further enhanced as well as a redundancy in the control circuit can be achieved.

Especially coordinated characteristics are provided by travel sensor and pressure sensor. In a hydraulic brake system, a high volume intake (corresponds to a large pedal travel) occurs at the beginning of a brake operation at low pressure, while during the further course of the brake operation, even with a slight pedal travel, a large pressure change occurs. Thus, the travel sensor delivers a low-noise signal in the range where the pressure sensor shows a bad signal/noise ratio, and vice versa. Since, also with an electric brake system, the driver should have the brake feeling that he is familiar with from the hydraulic brake system, here, as well, the equivalent characteristics appear.

Further advantages of the invention arise from the following description in the light of the pictures.

DETAILED DESCRIPTION OF THE INVENTION

Figure 1:
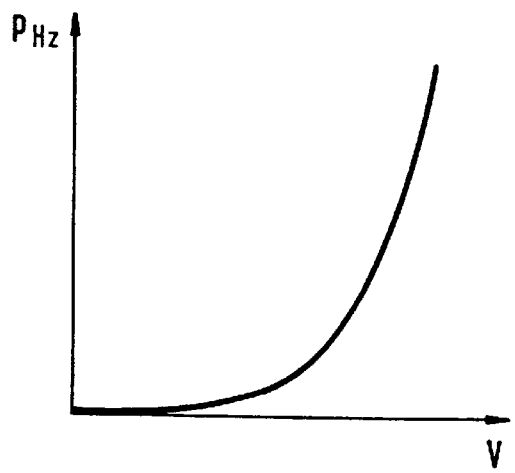
FIG. 1 shows a diagram of the master cylinder pressure $p_{Hz}(V)$ as a function of the volume intake V of a hydraulic brake system.

In FIG. 1, a diagram of the master cylinder pressure $p_{Hz}(V)$ as a function of the volume intake V of a hydraulic brake system is depicted. It can be seen that, already at a low pressure $p_{Hz}$, a large volume intake occurs, while during the further course of the brake operation a steep pressure increase accompanies even a slight volume intake V. The volume intake V here is proportional to the pedal travel s, while the master brake pressure prevailing in the brake system is proportional to the pedal force that is to be applied by the driver.

Figure 2:
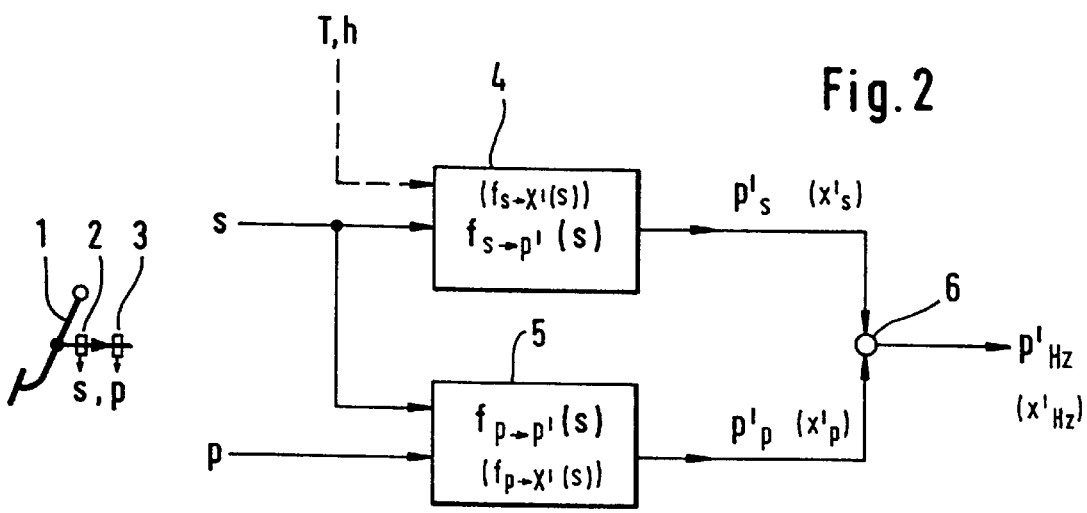
FIG. 2 shows a schematic presentation of the weighting and superposition of the sensor signals according to the invention.

FIG. 2 shows, in a schematic presentation, the weighting and superposition of the sensor signals. At a pedal 1, a travel sensor 2 and a pressure sensor 3 are located. Here, the pressure p is proportional to the pedal force F. The output signals s, p of the sensors 2, 3 are weighted in input circuits 4, 5 and result in partial setpoints $p'_s$ and $p'_p$, which are added up in a summer 6 to form a setpoint $p'_{Hz}$. In the input circuit 4, the weighting function $f_{s \to p}(s)$ is stored which weighs the travel signal in dependence of itself and converts it into the partial setpoint $p'_s$.

Alternatively, the derivation of the setpoint of the travel $x'_{Hz}$ of a brake pad from the partial setpoints $x'_s$ and $x'_p$ is indicated in parentheses. For this purpose, in the input circuits 4 and 5, the according weighting functions $f_{s \to x}(s)$ and $f_{s \to p}(s)$ are stored respectively.

Further on, it is indicated schematically that a temperature signal T and/or a humidity signal h can be provided as input variables of the input circuit 4. The according weighting function then is also dependent on the values T and h, respectively: $f_{s \to p}((s,T,h))$. Neither this dependence is explicitely shown in FIG. 2, nor is the, naturally also possible, impact of the respective signals on the input circuit 5.

Figure 3:
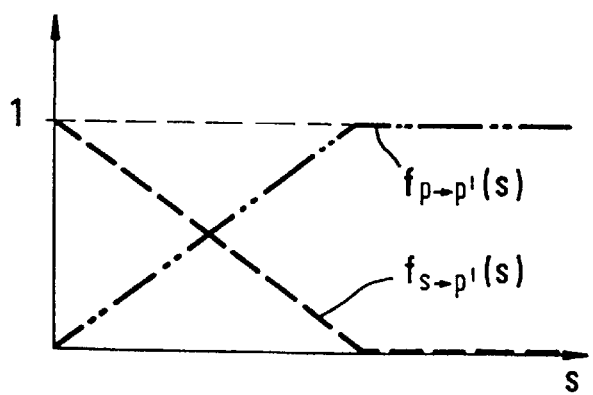
FIG. 3 shows an example of particularly simple weighting functions.

In FIG. 3, ramp functions are shown as an extremely simple example for the weighting functions. In this example, the weighting functions are chosen complementary, i.e. their sum always equals "1". In this case, it is possible to store only one of the weighting functions and to derive the others from this one. The usual case, however, is, as already mentioned in the introductory part of the description, to chose the weighting functions dependently on the vehicle type and, for instance, to store them as a charactaristic curve.

Figure 4:
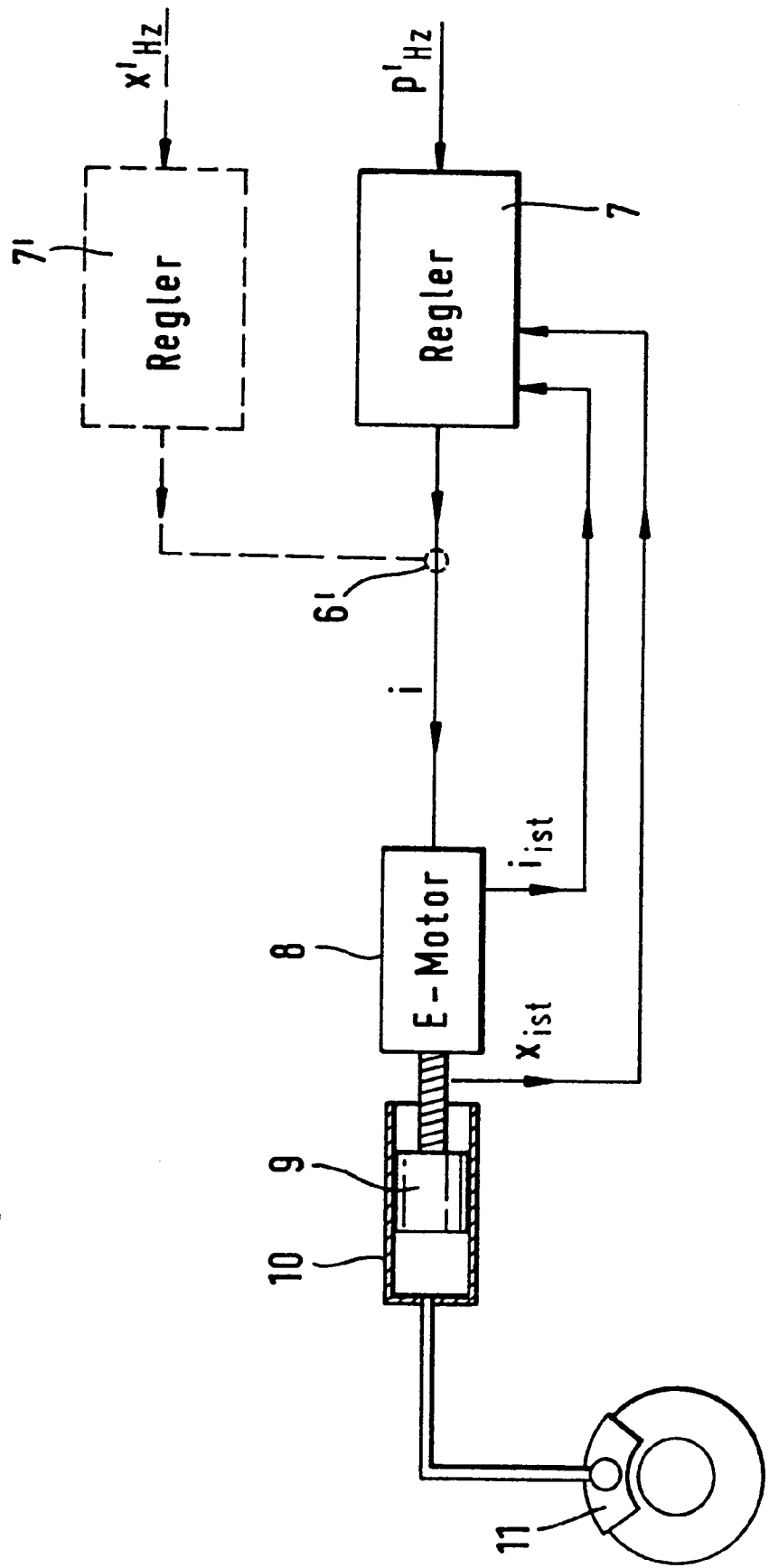
FIG. 4 shows a schematic example for the further processing of the determined nominal signal.

In FIG. 4, it is schematically illustrated how the determined setpoint $p'_{Hz}$ can further be processed. To this end, a controller 7 determines a control variable, in this case the current I, with which the electric motor 8 is loaded. The electric motor 8 shifts a plunger 9 which is guided in a cylinder 10. The thereby displaced volume V reaches the wheel brake 11 and thus shifts the brake pads. As actual values, the actual current value $i_{ist}$ as well as the travel $x_{ist}$ of the plunger 9 can be fed back to the controller 7. As a setpoint, instead of $p'_{Hz}$, also $x'_{Hz}$ can be used. A combination in which the two setpoints are respectively supplied to a controller 7 and a controller 7', indicated in dashed lines, is an alternative shown as well. The respective control variables are added up in the summer 6' and forwarded to the electric motor.

The setpoint generator according to the invention thus utilizes the information "pedal travel s" in combination with the information "pedal force p" by weighting them in the input circuits 4,5 and summing up the corresponding partial setpoints $p'_s$ and $p'_p$ to form a setpoint $p'_{Hz}$. Here, a countercurrent weighting takes place: If a small force acts on the pedal, the pedal travel is dominant; as the pedal force is growing, the latter is weighted more heavily. In this way, a smooth brake behavior is attained, whereby the comfort is enhanced and the wear of the employed components is reduced.

What is claimed is:

1. A setpoint generator for a pedal in an electrically controlled system, comprising:
   at least two parallely connected sensors working in accordance with different principles and generating different sensor output signals,
   electronic input circuits, coupled to said output signals, for generating an electric setpoint signal, wherein the output signals of the sensors are weighted in the electronic input circuits, and are summed to form said electric setpoint signal, wherein the weighting takes place in dependence on at least one of a temperature sensor signal or an humidity sensor signal, and wherein said weighting is effective for reducing the signal to noise ratio of said electric setpoint signal.

2. The setpoint generator according to claim 1, wherein the weighting takes place according to at least one weighting function which is stored in the electronic input circuits.

3. The setpoint generator according to claim 1, wherein the pedal is a brake pedal and each input circuit delivers a partial setpoint for adjusting the pressure in a hydraulic brake system.

4. The setpoint generator according to claim 1, wherein the pedal is a brake pedal and each input circuit delivers a partial setpoint for adjusting a brake pad travel.

5. The setpoint generator according to claim 1, wherein the pedal is a brake pedal and each input circuit delivers a partial setpoint for adjusting vehicle deceleration.

6. The setpoint generator according to claim 1, wherein the setpoints for different variables are determined which are each processed by a respective controller.

7. A setpoint generator for a pedal in an electrically controlled system, with at least two parallely connected sensors working in accordance with different principles and generating different output signals, with subsequently connected electronic input circuits, wherein, for the generation of an electric setpoint, the output signals of the sensors are weighted in the electronic input circuits, wherein the partial setpoints are summed, and wherein the weighting of at least one output signal of one of said sensors takes place in dependence on the output of at least one of the sensors, and wherein said weighting is effective for reducing the signal to noise ratio of said electric setpoint.

* * * * *